Dec. 5, 1933. J. BIJUR 1,937,507
LUBRICATION
Filed Jan. 7, 1931
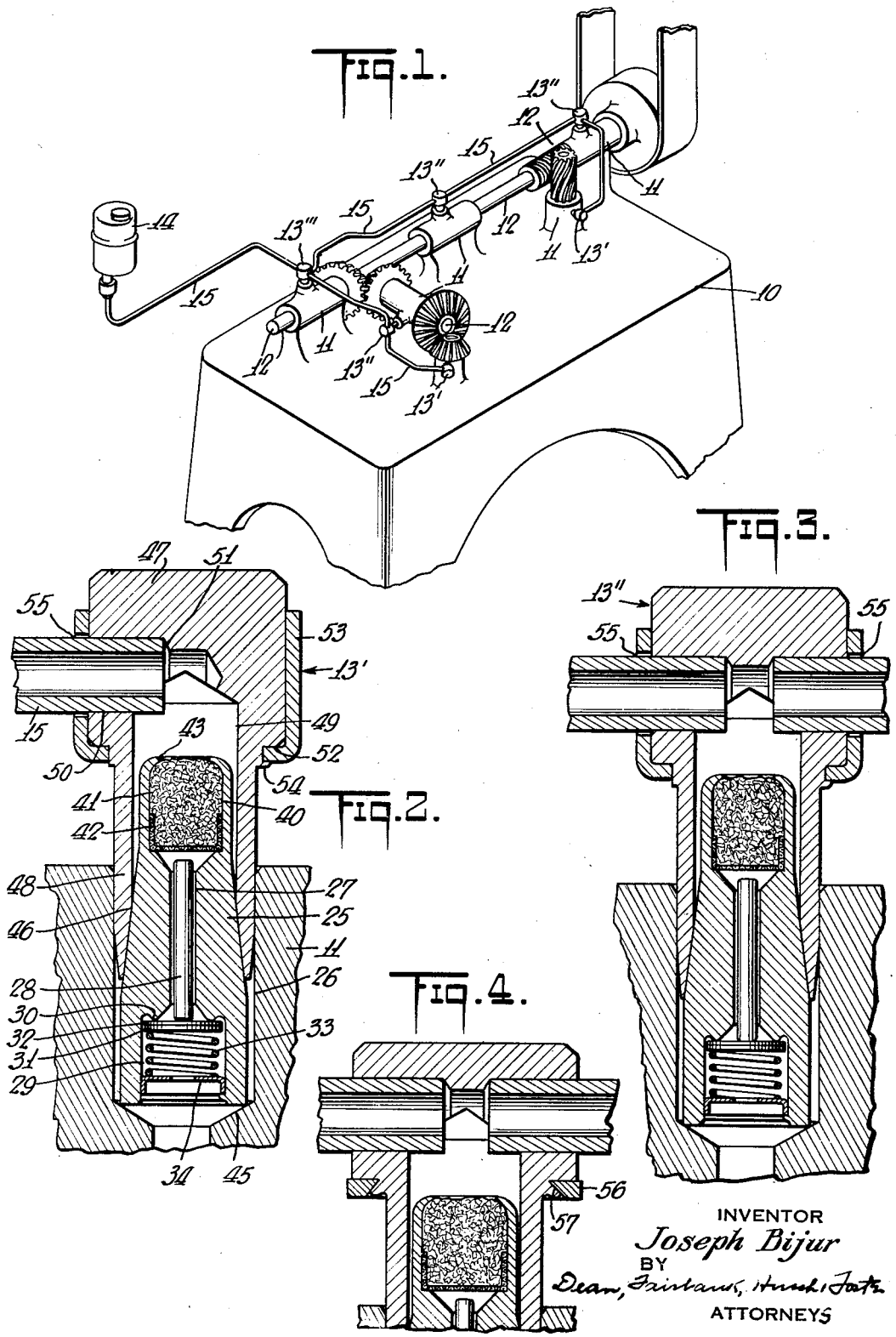
INVENTOR
*Joseph Bijur*
BY
Dean, Fairbanks, Hirsch & Foster
ATTORNEYS Patented Dec. 5, 1933

1,937,507

UNITED STATES PATENT OFFICE 1,937,507

LUBRICATION

Joseph Bijur, New York, N. Y., assignor to Auto Research Corporation, a corporation of Delaware Application January 7, 1931. Serial No. 507,127

19 Claims. (Cl. 184—7)

My invention relates primarily to liquid distribution and particularly to lubrication and it is especially concerned with flow controlling devices which may be used adjacent to or at the outlets of a central chassis lubricating system and which in a preferred embodiment may be of the general character described in my Patent No. 1,632,772.

In common with said patent my invention is directed to conduit terminal installations embodying reliable flow control or metering instrumentalities, unobtrusive in use, which is the preferred embodiments are composed of a few parts of simple construction, all readily manufactured by automatic machines of standard type and quickly assembled without the need of skilled labor.

Among the objects of the present invention are to provide unobtrusive flow controlling pipe terminals of the character described, involving a minimum number of parts that may be assembled and mounted with ease with substantially no added bulk, as compared to pipe terminals devoid of flow control means and in which the process of application in place results in no twisting or other destructive strains upon the piping and effects a non-leaky connection without the use of gasket material.

Another object is to provide a lubricating installation, the T or junction elements of which may be most conveniently installed without the necessity of utilizing threaded connections and moreover with the definite assurance that the arms or sockets thereof shall extend along the length of the conduits when the elements are rigidly fixed with respect to the bearing or carrying structure.

Other objects are in part obvious and in part pointed out hereinafter.

Although the present invention is broadly directed to flow controlling terminals of various constructions, in a preferred form it is particularly adapted for application to flow restriction devices or drip plugs of the type described in my Patent No. 1,632,772 and the British Patent No. 261,967, which devices employ strainers, pin or plug restricted passages, check valves, and/or other flow controlling and/or obstructing elements.

A particular feature of the invention resides in the attachment of an unthreaded drip plug or other flow metering unit or cartridge to a socket in a mounting structure or bearing element by means of a cap structure coacting with the cartridge to effect a spreading action, thereby to grip or engage the wall of the socket. Preferably the cartridge has a tapered intermediate portion encircled by a correspondingly tapered skirt, so that the spreading and gripping action will take place as the result of a direct hammer blow upon the cap structure. Preferably the cap is not only of sufficient ruggedness to withstand the blow, but also to withstand otherwise destructive strains imposed by a prying tool, for removal of the cap on the rare occasions that such removal may be desired.

The cap may also desirably serve as the lubricant connection to the cartridge, from a feed pipe preferably soldered or brazed into an appropriate opening in the cap.

In the accompanying drawing in which there is shown one or more of the various possible embodiments of the features of this invention:

Fig. 1 is a perspective view showing the attachment of the lubricating installation to a typical machine;

Figs. 2 and 3 are longitudinal vertical sectional views showing the flow controlling instrumentalities, respectively, at the end and in the run of a line; and Fig. 4 is a fragmentary vertical sectional view showing a modification.

In Fig. 1 the base 10 of the machine supports a series of fixed bearing elements 11 in which rotate the shafts 12. Attached to these fixed bearing elements 11 are the flow controlling instrumentalities 13, which are connected to a source of lubricant supply 14, which may be a gravity tank or more preferably be associated with a manually or automatically actuated source of lubricant pressure or pump.

The flow metering instrumentalities (more specifically shown upon Figs. 2 and 3) may preferably be of the flow restriction type and consist of a body 25 inserted into a socket 26 in the bearing structure, 11. The body 25 is bored at 27 to receive a restriction pin 28, forming a narrow, annular crevice or restriction passage therewith, the diameter and length of which determine the rating of the device. On the outlet side of the passage 27—28 is a socket 29 integrally provided with a valve seat 30 adapted to cooperate with the valve 31 which has a seating facing 32 of a material, such as oil-silk, which will readily take the impression of the valve seat 30 and which will not be disadvantageously affected by the lubricant. If desired, the valve may be seated by the spring 33, held in place within the socket 29 by the cup 34. At the inlet side the body 25 is cupped as at 40, the cup substantially filled by a felt strainer plug 41, backed by a screen cup 42 and held in position by the rolled-over edge 43 thereof. The outlet end of the body 25 is bottomed upon the sloping ledge 45 of the socket 26. The side wall 46 of the body 25 intermediate its ends is of frusto-conical shape, to cooperate with the wedging cap 47, the clamping skirt or annulus 48 being interiorly tapered to engage the side wall and exteriorly cylindrical for coaction with socket 26. The skirt 48 is of substantially less thickness than the portion 46 of the body 25 with the result that the skirt will be spread outwardly leaving the cartridge unaffected when pressed into the socket 26 thereover. By means of the space 49 within the skirt 48 communication is established between the inlet end of the body 25, and the pipe receiving openings 50 ordinarily at right angles thereto, said openings being provided with abutment shoulders 51 for limiting insertion of the pipe ends 15. The feed pipes 15 may be preferably soldered or brazed in place after the terminal has been installed. One only of such openings 50 would be used for a drip plug attached at the end of a line (see part 13' Fig. 1 and Fig. 2); two when in the run of a line, (see part 13'' Fig. 1 and Fig. 3) and three or more where in addition to the functions performed by the arrangement of Fig. 3, one or more branch lines are in communication with the cap (see part 13''' in Fig. 1).

The wedging member 47 is preferably provided with an enlarged rather massive head, so that it will better withstand the blow of a mallet or other impact device used for applying the terminal.

To withstand the strain of a prying tool used to remove the wedging cap on the rare occasions that such removal may be desirable, a reinforcement is provided at that part of the wedging cap engaged by such tool. Preferably a thimble 53 serves for this purpose, with a central opening encircling the wedging cap and engaging the lower shoulder 52 thereof against which it is held by staking 54. The thimble 53 has apertures 55 registering with openings 50 to permit insertion of the pipe ends 15.

In Fig. 4 the thimble 53 is replaced by an annular washer 56 which fits into an annular notch 57 in the lower end of the head 47.

Preferably the thimble 53 or the annular washer 56 are of sheet steel while the wedging member 47 and the body 25 are of brass alloy.

Although the drip plug or flow controlling instrumentality arrangement shown upon Figs. 2, 3 and 4 may be made in widely varying dimensions, its widest application to machinery of various characters renders certain dimensions particularly suitable. By way of illustration, the body 25 may be ¾ inch in length and at its greatest width be about $\frac{3}{32}$ inch in diameter, as compared to its narrowest diameter of about $\frac{3}{32}$ inch, the intervening frusto-conical portion having an apical angle of about 14 degrees. The wedging device may have a head diameter of about $\frac{7}{16}$ inch to ½ inch and an outside diameter at its skirted portion of about $\frac{5}{16}$ inch to ⅜ inch.

In assembling the arrangement shown, the drip plug 25 may be placed in the socket 26 and the wedging cap 47 inserted into the socket and telescoped over the protruding upper end of the drip plug 25. The cap 47 is disposed with its feed pipe openings extending in the proper directions to receive the lubricant conduits or pipe lengths 15. A single blow with a mallet upon head 47 completes the installation of the terminal.

If it is desired to remove a drip plug, an appropriate clevised prying tool may be employed to press against the head 47 at the thimble 53 or the annular washer 56, to remove the cap. The drip plug is now free to be removed from the socket by hand.

The various heads or caps 47 may be preliminarily associated together by attaching thereto the various connecting pipe lengths 15 to make up a harness which is applied to the lubricated structure by inserting each head or cap at the socket of the bearing into which the drip plug cartridge has first been inserted and then imparting to each cap or head the required mallet blow. Such arrangement broadly is disclosed and claimed in the copending application Serial No. 506,071, filed January 2, 1931.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

I claim:
1. In a pipe terminal combination, a mounting structure provided with a socket, a longitudinal frusto-conical wedging member inserted in said socket and provided with a central passageway, a cap for said socket provided with a depending skirt to be wedged between said member and said socket in a liquid-tight manner and a pipe connected to said cap, liquid communication being established between said pipe and said socket through said cap.

2. In combination, a lubricated structure provided with a socket, a longitudinal flow controlling instrumentality inserted therein provided with a frusto-conical wedging portion, a cap provided with a depending skirt wedged between said instrumentality and said socket and a lubricant conduit connected to said cap and communicating with said instrumentality therethrough.

3. In combination, a lubricated structure provided with a socket, a flow controlling instrumentality inserted within said socket, a cap also inserted within said socket, and clamping said instrumentality in position therein and a lubricant conduit connected to said cap, the instrumentality and the cap having coacting spreading portions to expand for tight engagement with the wall of said socket.

4. In combination, a lubricated structure provided with a socket, a flow controlling instrumentality inserted within said socket, a cap also inserted within said socket, and clamping said instrumentality in position therein and a lubricant conduit connected to said cap, said cap being provided with a deformable skirt which upon insertion and pressure will be expanded to tightly grip both the socket and the instrumentality and provide a liquid tight connection therebetween.

5. In combination, a lubricated structure provided with a socket, a flow controlling instrumentality inserted within said socket, having cylindrical ends and an intermediate frusto-conical wedging portion, a cap with a massive head and a depending tapered skirt for telescoping about the instrumentality and within the socket, said skirt and said frustrated conical portion coacting to form a lubricant tight connection.

6. In combination, a lubricated structure provided with a socket, a longitudinal drip plug cartridge inserted in said socket provided with a central bore substantially filled with a restriction pin and inlet and outlet sockets on either side of said pin respectively containing a strainer and a check valve, a cap also inserted within said socket and about said cartridge and clamping said cartridge into position by wedging contact with the exterior portion thereof between said socket and a lubricant conduit connected to said cap.

7. In combination, a socketed lubricated structure, a longitudinal flow metering instrumentality inserted within said socket, a wedge cap also inserted in said socket holding said instrumentality in position therewithin, and a lubricant conduit connected to said cap, said cap being provided with a massive head to stay the application of a pressure applying tool with a substantially wide vertical socket to form a skirted portion which encircles the instrumentality and wedges between said instrumentality and the side of the socket.

8. In combination, a socketed lubricated structure, a longitudinal flow metering device inserted within said socket, a wedge cap also inserted in said socket to connect said device thereto in a lubricant tight fashion and conduit means connected to said cap, said cap being provided with one or more small sockets provided with abutment shoulders for receiving the end of the conduit means and with a large socket at right angles to said receiving socket to form a skirted portion which encircles said device and wedges therebetween and the side of the socket.

9. In combination, a socketed lubricated structure, a longitudinal flow metering instrumentality inserted within said socket, a wedge cap also inserted in said socket holding said flow metering instrumentality firmly in position therewithin and reinforcing means upon said cap enabling it to be withdrawn by a suitable prying tool.

10. In combination, a socketed lubricated structure, a longitudinal flow metering device inserted within said structure, a wedge cap also inserted in said socket and holding said device in position therebetween in a lubricant tight fashion and a conduit connected to said cap, said cap being provided with a shoulder for cooperating with a suitable prying tool, which shoulder is reinforced by means of a metal cover substantially harder than the metal of the cap.

11. In combination, a socketed lubricated structure, a longitudinal flow metering device inserted within said device, a wedge cap with enlarged head also inserted in said socket holding said device in position therewithin and a conduit connected to said cap, said head being enclosed by a thimble of a substantial harder metal than the metal of the cap so as to enable it to be withdrawn with a suitable prying tool without deformation.

12. In combination, a socketed lubricated structure, a longitudinal flow metering device inserted within said device, a wedge cap with enlarged head also inserted in said socket holding said device in position therewithin and a conduit connected to said cap, the lower end of the head of said cap being formed for cooperation with a suitable prying tool and being provided with an annular groove for receiving a metal ring of material substantially harder than the material of the cap to protect it against deformation.

13. In combination, a socketed lubricated structure, a flow metering device inserted within said socket, a wedge cap also inserted in said socket holding said device firmly in position therewithin and means reinforcing said cap where it contacts upon withdrawal with a suitable prying tool, said device and wedge cap being of brass and said reinforcing means being of steel.

14. A wedge type flow metering instrumentality, a longitudinal body, the outlet and inlet ends of which are cylindrical, the former being of greater diameter than the latter, which cylindrical ends are connected by a frusto-conical wedging portion.

15. A wedge type flow metering instrumentality, comprising a longitudinal body with a central passageway containing a flow metering element, the exterior portion of the body of which is of conical shape to enable said instrumentality to be wedged into position in a suitable socket.

16. A wedge type drip plug comprising a longitudinal body provided with a central passageway substantially filled by a restriction pin and with inlet and outlet sockets containing respectively a strainer and a check valve, the portion of the body encircling said restricted passageway being of frusto-conical shape so as to enable said drip plug to be wedged into a suitable socket.

17. The drip plug of claim 16 in which the frustrated conical portion has an apical angle of about 14 degrees.

18. In a central lubricating installation, a mounting structure provided with a socket, a flow metering cartridge in said socket provided with a central passageway, and an annular cap for said socket provided with a depending skirt to be wedged between said member and said socket in a liquid-tight manner encircling said member, said cap being provided with means to enable attachment of conduit means thereto.

19. In combination, a socketed lubricated structure, a longitudinal flow transmitting means inserted within said socket, and an annular wedge cap also inserted in said socket holding said means in position there within, said cap being provided with a relatively massive head to receive the applicaiton of a pressure applying tool and with a skirted portion which encircles the means and wedges between said means and the side of the socket.

JOSEPH BIJUR.